United States Patent [19]

Yokota et al.

[11] Patent Number: 4,490,498

[45] Date of Patent: Dec. 25, 1984

[54] RESINOUS COMPOSITION HAVING AN INCREASED FLAME RETARDANCE

[75] Inventors: Kenichi Yokota, Ohtsu; Shigeo Nishita, Mohka; Takashi Sakauchi, Ohtsu, all of Japan

[73] Assignee: Kanegafuchi Kagaku Kogyo Kabushiki Kaisha, Osaka, Japan

[21] Appl. No.: 458,361

[22] Filed: Jan. 17, 1983

[30] Foreign Application Priority Data

Jan. 23, 1982 [JP] Japan .................................... 57-9043

[51] Int. Cl.$^3$ ............................................... C08K 5/06
[52] U.S. Cl. .................................... 524/371; 524/403; 524/405; 524/412; 524/431; 524/440
[58] Field of Search ............... 524/440, 403, 405, 412, 524/371, 431

[56] References Cited

U.S. PATENT DOCUMENTS 3,524,761 8/1970 Humphrey ........................ 524/405
3,988,284 10/1976 Wurmb et al. ..................... 525/426
4,301,058 11/1981 Neukirchen et al. ............... 524/288

FOREIGN PATENT DOCUMENTS 46-13149 4/1971 Japan .

OTHER PUBLICATIONS

Charles E. Hoke, "Compounding Flame Retardance into Plastics"-SPE Journal, May 1973-vol. 29, pp. 36-40.

*Primary Examiner*—Veronica P. Hoke
*Attorney, Agent, or Firm*—Armstrong, Nikaido, Marmelstein & Kubovcik

[57] ABSTRACT

A resinous composition having an increased flame retardance is disclosed, which comprises (A) 10 to 60% by weight of a mixture comprising 100 parts by weight of a polyolefin resin, 20 to 60 parts by weight of a halogenated organic flame-retardant agent, 7 to 30 parts by weight of antimony trioxide and 10 to 40 parts by weight of zinc borate hydrate, and (B) 90 to 40% by weight of a magnetic body powder. The compositions are endowed with surprising glowing combustion resistance as well as superior flame combustion resistance.

2 Claims, No Drawings

RESINOUS COMPOSITION HAVING AN INCREASED FLAME RETARDANCE

BACKGROUND OF THE INVENTION

The present invention relates to a resinous composition having a markedly increased flame retardance which comprises a magnet body powder and a polyolefin resin, containing a specifically combined use of a halogenated organic flame-retardant agent, antimony trioxide and zinc borate. More particularly, it is concerned with an exceedingly useful flame-retardant resinous composition having a high level of flame combustion resistance and a high level of glowing combustion resistance which is characterized by conjoint use of a halogenated organic flame-retardant agent, antimony trioxide and zinc borate hydrate in improving flame retardance of a polyolefin resin containing a magnetic body powder in large quantities.

A resinous composition prepared by mixing a large amount of a magnetic body powder with a synthetic resin is in widespread use as a plastic magnet. A composition using a polyolefin as the synthetic resin is especially useful because of cheapness and superior processability. In such plastic magnets an improvement of flame retardance has been recently needed in the electric and electronic applications. That is, materials satisfying both flame combustion resistance and glowing combustion resistance provided in so-called UL-94 Standard are strongly demanded. However, a known and general process for increasing flame retardance of polyolefin resins containing a magnetic body powder in a great amount by addition of common halogenated organic flame-retardant agents such as decabromodiphenyl ether, hexabromobenzene and "DECHLORANE (Registered trademark manufactured by Hooker Chemical And Plastics Corporation)" and antimony oxide is insufficient to provide the foregoing high level of flame retardance required for the practical usefulness. That is, by the foregoing process a high level of flame combustion resistance is achieved with relative ease but a resinous composition containing a large quantity of a magnetic body powder shows a tendency to have long glowing combustion time (called as glowing-time) that red-heated state lasts long even after a flame was blown out and thus practically satisfactory flame retardance is not obtained. In an attempt to solve these problems, a greater amount of flame-retardant agents is employed or fillers such as talc and the like are added but those are far from satisfaction in practical application on account of drawbacks including a decrease in mechanical strength of the final mold products as well as processability, an increase in cost and the like.

SUMMARY OF THE INVENTION

It is therefore an object of the present invention to provide a resinous composition having an increased flame retardance while eliminating the deficiencies attendant on the conventional compositions.

It is another object of the present invention to provide a resinous composition improved especially in glowing combustion resistance.

These and other objects of the present invention together with the advantages thereof will become apparent to those skilled in the art from the detailed desclosure of the present invention as set forth hereinbelow.

Through a series of studies and experiments, the present invention has been completed on the discovery that in affording flame retardance to polyolefin resins containing a magnetic body powder in a great amount, a high level of flame retardance can be accomplished peculiarly by the combined use of specific flame-retardant agents, while solving the defects the conventional processes have.

DETAILED DESCRIPTION OF THE INVENTION

A resinous composition of the present invention comprises

A. 10 to 60% by weight of a mixture comprising 100 parts by weight of a polyolefin resin, 20 to 60 parts by weight of a halogenated organic flame-retardant agent, 7 to 30 parts by weight of antimony trioxide and 10 to 40 parts by weight of zinc borate hydrate, and B. 90 to 40% by weight of a magnetic body powder.

The polyolefin resin used in the present invention may include polyethylene, polypropylene, polybutene-1, ethylene-propylene copolymers, ethylene-vinyl acetate copolymers, ethylene-vinyl chloride copolymers, synthetic resins comprising other olefin monomers as major ingredients and mixtures of foregoings. High polymer materials other than the foregoing polyolefin resins may also be added with a view to improving properties of the final compositions. Polypropylene resin is practically preferred to use owing to good balance of processability, heat resistance and economy. In final compositions according to the present invention, each ingredient should desirably be dispersed uniformly and if thorough mixing and mingling is effected, polyolefin resins in any form may also be used, but from the standpoint of industrial practice polyolefin resins in a form of powder are preferred. Accordingly in the present invention a powdery polypropylene resin is most preferably used.

The flame-retardant agents suitably used in compositions of the present invention are halogenated organic flame-retardant agents, antimony trioxide and zinc borate hydrate.

The halogenated organic flame-retardant agents are chlorinated or brominated organic compounds. Examples are hexabromobenzene, decabromodiphenyl ether, tetrabromobisphenol A dimethyl ether, tetrabromobisphenol S, $\beta$-bromoethyl benzene, bis(tetrabromophenoxy)ethane, brominated polyphenylene ether, brominated polystyrene and other brominated aromatic compounds; a series of chlorinated polycyclic alicyclic compounds including "DECHLORANE", polychlorostyrene, chlorinated polyphenylene ether and other chlorinated aromatic compounds; chlorinated paraffin and other chlorinated aliphatic compounds and the like, Among those, brominated aromatic compounds and chlorinated polycyclic alicyclic compounds are useful industrially. In the present invention brominated polystyrenes are especially effective, as will be described later. Brominated polystyrene has the general formula

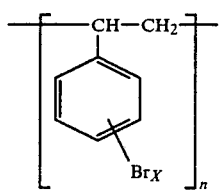

in which X is an integer of from 1 to 5 and n is an integer of 2 or more. Brominated polystyrenes having an average value of bromination degree X in a range of from 2 to 4 and polymerization degree n more than 100 are easily and industrially obtainable and suitably employed. The halogenated organic flame-retardant agent may be used singly or in combination of two or more. In cases where the halogenated organic flame-retardant agents are used in an amount less than 20 parts by weight based on 100 parts by weight of polyolefin resin, flame combustion resistance is deteriorated and, on the other hand, in cases where more than 60 parts by weight are used, an adverse influence may sometimes be placed on mechanical properties, heat resistance, processability and the like. It is therefore desired to use halogenated organic flame-retardant agents in an amount of from 20 to 60 parts by weight, more preferably 35 to 50 parts by weight based on 100 parts by weight of polyolefin resin.

Antimony trioxide, when used in conjunction with the foregoing halogenated organic flame-retardant agents, produces outstanding synergistic effects on flame combustion resistance. Antimony trioxide is used in a ratio by weight of 1 to 2–5 of halogenated organic flame-retardant agents, most-preferably 1 to 2–3. Hence, in the present invention 7 to 30 parts by weight of antimony trioxide based on 100 parts by weight of polyolefin resin are preferably used.

Zinc borate hydrate used in the present invention is a compound represented by $2Zn.3B_2O_3.3.5H_2O$. Zinc borate hydrate is particularly effective in improving glowing combustion resistance, though exhibiting a given effect on an increase in flame combustion resistance. In the case of less than 10 parts by weight based on 100 parts by weight of polyolefin resin, a sufficient effect on glowing combustion resistance is not obtained, inversely, in the case of more than 40 parts by weight, adverse effects appear on the physical properties. It is therfore well to use zinc borate hydrate in an amount ranging from 10 to 40 parts by weight based on 100 parts by weight of polyolefin resin.

As magnetic body powder used in the present invention a variety of powdered magnetic bodies may be selectively employed according to applications of the final compositions. Typical examples are hexagonal ferrite powder such as barium ferrite and strontium ferrite; spinel ferrite powder such as manganese-zinc ferrite, nickel-zinc ferrite and manganese-magnesium ferrite; rare earth metal-cobalt alloy powder such as samarium-cobalt alloy, praseodymium-cobalt alloy and misch metal-cobalt alloy; aluminium-nickel-cobalt alloy powder and iron-chrome-cobalt alloy powder. These powdery magnetic bodies may be used singly or in combination of two or more. Among foregoing powdery magnetic bodies, hexagonal ferrite powder, spinel ferrite powder and rare earth metal-cobalt alloy powder are suitably used from the standpoint of economy, magnetic performance and easiness of industrial obtaining. A composition containing hexagonal ferrite powder such as barium ferrite and strontium ferrite may be used in a wide range of application and is important, in particular. The amount of the powdery magnetic body contained in the compositions of the present invention is in a range of from 40 to 90% by weight, more preferably 50 to 90% by weight, though not uniformly determined because variable depending on the specific gravity of the powdery magnetic body, constitution of the rest components and the like. In the case of less than 40% by weight, magnetic performance becomes insufficient, on the other hand, in the case of more than 90% by weight, a decrease in processability and mechanical strength is sometimes resulted.

In order to improve properties of the compositions of the present invention, additives for modification such as heat stabilizers, processing aids, interface controllers and mechanical strength improving agents may further be added in such an amount that a high level of flame retardance to be achieved peculiarly by the present invention is not disturbed. Improvements in heat stability upon molding, heat aging resistance and moldability are especially desirable by addition of heat stabilizers and processing aids.

In admixing ingredients to prepare the compositions of the present invention, an optional process, which is generally used in the preparation of synthetic resin compounds, may be employed. For example, ingredients are admixed and dispersed uniformly by the use of a high-speed mixer, subjected to heat rolls or an extruder, then cut to be in a form of pellets, thereafter supplied as materials for molding and processing.

Hereinbelow are the effects and results provided by the present invention.

As mentioned earler, compositions prepared by imparting flame retardance to polyolefin resins with high content of powdery magnetic bodies by addition of well-known flame-retardant agents are long in glowing-time, while superior in flame combustion resistance, and thus are not always satisfactory in practical usefulness. The reason is not necessarily made clear, but is surmised to be as follows: a great amount of magnetic body powder is heated by heat of flaming combustion thus forming a major part of core of glowing which causes a long glowing-time. Moreover, charred residue generated by the decomposition of halogenated flame retardant agents also forms the core of glowing to lengthen the glowing time. Zinc borate hydrate, one of the flame-retardant agents used in the present invention, suppresses glowing combustion very effectively to thus shorten the glowing-time. It is conjectured as a reason that a glassy substance generated by conversion of zinc borate bydrate deposits to cover the surface of decomposed charred residue of the magnetic body powder and the halogenated organic flame-retardant agents, which cause glowing, and the surface of the resin which is combustible, to thus prevent those agents from coming into contact with oxygen, whereby glowing combustion is repressed. The halogenated organic flame-retardant agents usually decompose at the vicinity of a burning temperature of synthetic resins and produce charred residue in a considerably large amount, whereas brominated polystyrenes produce a less amount of the charred residue. It is considered that by the synergistic effect of the above-mentioned action and the action of zinc borate hydrate as aforesaid, the glowing-time can be unexpectedly reduced. Such effects could not have been expected however, even though brominated polystyrenes are apparently analogous in chemical structure to other brominated aromatic compounds, widely used, such as hexabromobenzene and decabromodiphenyl ether.

The compositions of the present invention are molded to provide molded products of plastic magnetic bodies, which are in a wide use for various purposes including electric and electronic apparatuses and devices, measuring instruments and rotating machines. The compositions of the present invention possess a high level of flame retardance which has been difficult heretofore and thus have a wide range of application, the usefulness of which are exceedingly high.

Hereinafter the present invention will be explained in more detail by way of examples that follow, to which the present invention is in no way limited.

EXAMPLE 1

30% by weight of a mixture comprising 100 parts by weight of powdery polypropylene resin, 35 parts by weight of decabromodiphenyl ether, 12 parts by weight of antimony trioxide, 20 parts by weight of zinc borate hydrate, 2 parts by weight of a stabilizer and 0.5 part by weight of a processing aid, and 70% by weight of barium ferrite powder were charged into a 10 l Super Mixer, mixed with stirring, then subjected to 8-inch heat rolls to thus provide pellets. The resulting pellets were molded by an injection molding machine to obtain test samples of 5"×½"×1/16". The test samples were subjected to burning test in accordance with the vertical burning test of UL-94 and the results were obtained as shown in Table 1.

It is understood from the results in Table 1 that the test samples of the present invention are superior in glowing as well as flame combustion resistance and evaluated as UL-94 V-0.

EXAMPLES 2-11

In a similar manner to the procedure of Example 1, test samples were prepared by varying the kind of the halogenated organic flame-retardant agent and the proportions of said flame-retardant agent, antimony trioxide, zinc borate hydrate and the ferrite powder as shown in Table 1.

It is apparent that the compositions of the present invention possess superior flame retardance which are evaluated as UL-94 V-1 or higher, and that the brominated polystyrene as halogenated organic flame-retardance agents produces a particularly outstanding effect against glowing combustion.

COMPARATIVE EXAMPLES 1-2

Test samples of Comparative Examples 1 and 2 were prepared similarly to Examples 3 and 4, respectively, excepting that zinc borate hydrate was not used. The test samples were subjected to burning test. The glowing-time was long and thus glowing combustion resistance was not specifically superior while flame combustion resistance was superior and ranked as UL-94 HB, as apparent from Table 1.

COMPARATIVE EXAMPLE 3

Test samples were prepared and subjected to burning test in a similar manner to that of Example 1, with the exception that the amounts of decabromodiphenyl ether and antimony trioxide were 10 parts by weight and 5 parts by weight, respectively, outside the range of the present invention. The test samples were burnt up to clamps with which the samples are grasped and flame retardance was found inadequate.

TABLE 1

|  |  | Ferrite content (% by weight) | Amount of flame-retardant agents (Parts by weight) | | | | | Flame combustion (Sec) | Glowing combustion (Sec) | Evaluation according to UL Standards |
|---|---|---|---|---|---|---|---|---|---|---|
|  |  |  | DBDE | HBB | Brominated polystyrene | $Sb_2O_3$ | Zinc borate hydrate |  |  |  |
| Example | 1 | 70 | 35 | — | — | 12 | 20 | 0 | 22–28 | V-0 |
|  | 2 | 70 | 35 | — | — | 12 | 30 | 0 | 18–24 | V-0 |
|  | 3 | 70 | 35 | — | — | 12 | 40 | 0 | 10–15 | V-0 |
|  | 4 | 70 | — | 35 | — | 12 | 20 | 0 | 20–27 | V-0 |
|  | 5 | 65 | 60 | — | — | 30 | 20 | 0 | 19–25 | V-0 |
|  | 6 | 70 | 40 | — | — | 7 | 20 | 0–2 | 22–27 | V-0 |
|  | 7 | 70 | — | — | 40 | 14 | 10 | 0–2 | 3–5 | V-0 |
|  | 8 | 70 | — | — | 40 | 14 | 20 | 0–2 | 1–2 | V-0 |
|  | 9 | 40 | 35 | — | — | 12 | 20 | 0 | 15–21 | V-0 |
|  | 10 | 90 | 35 | — | — | 12 | 20 | 0 | 25–28 | V-0 |
|  | 11 | 70 | 20 | — | — | 10 | 20 | 10–15 | 42–55 | V-1 |
| Comp. | 1 | 70 | 35 | — | — | 12 | — | 0 | 115–127 | HB |
| Example | 2 | 70 | — | 35 | — | 12 | — | 0 | 108–122 | HB |
|  | 3 | 70 | 10 | — | — | 5 | 20 | Burning to clamps | — | — |

DBDE: Decabromodiphenyl ether
HBB: Hexabromobenzene
(1): Range of flame burning time in every contact with a flame (10 times in total)
(2): Range of glowing combustion time of each sample (5 pieces in total)

What we claim is:

1. A resinous molding composition having an increased flame retardance comprising
   A. 10 to 60% by weight of a mixture comprising 100 parts by weight of a polyolefin resin, 20 to 60 parts by weight of decabromodiphenyl ether, 7 to 30 parts by weight of antimony trioxide and 10 to 40 parts by weight of zinc borate hydrate, and
   B. 90 to 40% by weight of a magnetic ferrite powder.
2. The resinous composition of claim 1, wherein said polyolefin resin is a powdery polypropylene resin.

* * * * *